United States Patent [19]
Diels et al.

[11] Patent Number: 5,367,528
[45] Date of Patent: Nov. 22, 1994

[54] MOTION INDUCED ELIMINATION OF DEAD BAND IN A SHORT PULSE LASER GYRO

[75] Inventors: Jean-Claude M. Diels, Albuquerque, N. Mex.; Ming Lai, Encinitas, Calif.

[73] Assignee: Honeywell Inc., Minneapolis, Minn.

[21] Appl. No.: 880,802

[22] Filed: May 8, 1992

[51] Int. Cl.[5] .............................. H01S 3/098
[52] U.S. Cl. .......................... 372/18; 372/94
[58] Field of Search ..................... 372/94, 18

[56]          References Cited
          U.S. PATENT DOCUMENTS

| 4,525,843 | 6/1985 | Diels | 372/94 |
| 4,815,080 | 3/1989 | Chesnoy et al. | 372/18 |
| 5,017,806 | 5/1991 | Edelstein et al. | 372/94 |
| 5,119,383 | 6/1992 | Duling, III et al. | 372/94 |

OTHER PUBLICATIONS

Delfyett, et al., Generation of Subpicosecond High--Power Optical Pulses from a Hybrid Mode-Locked Semiconductor Laser, Optics Letters, Dec. 1, 1990, vol. 15, No. 23.

Diels, et al., Degenerate Four-Wave Mixing of Femtosecond Pulses in an Absorbing Dye Jet, Journal of Optical Society of America B, vol. 3, p. 535, Apr. 1986.

Salin, et al., Nonreciprocal Phase Shifts in a Femtosecond Dye Laser, Optics Letters, vol. 5, No. 16, Aug. 1990.

Lai, et al., Interference Between Spontaneous Emission in Different Directions, 29 Jan. 1990, Am. J. Phys. 58(10) Oct. 1990.

Raja, et al., Novel Wavelength Resonant Optoelectronic Structure and its Application to Surface Emitting Semiconductor Lasers, Electronics Letters, 1 Sep. 1988, vol. 24, No. 18.

Christian, et al., Picosecond Pulsed Diode Ring-Laser Gyroscope, Optical Society of America, 1991.

*Primary Examiner*—Georgia Y. Epps
*Attorney, Agent, or Firm*—John G. Shudy, Jr.

[57]           ABSTRACT

A passively mode-locked laser gyro having a saturable absorber in constant motion. The saturable absorber is mechanically vibrated or rotated in a direction transverse to the longitudinal pulses passing through the absorber. The vibrational or rotational motion of the absorber dithers the effective scattering error source. The saturable absorber may be a multiple quantum well device. The multiple quantum well device may be attached to two dither drives to provide continuous circular motion of the multiple quantum well device. The motion generator can generate both linear and non-linear motion. The passively mode-locked laser qyro may be constructed from fiber optics with a bias modulator and gain medium.

16 Claims, 6 Drawing Sheets

MOTION INDUCED ELIMINATION OF DEAD BAND IN A SHORT PULSE LASER GYRO

The invention relates to laser gyros and more particularly to passively mode-locked laser gyros having saturable absorbers which are moved continuously.

BACKGROUND OF THE INVENTION

Figure 2:
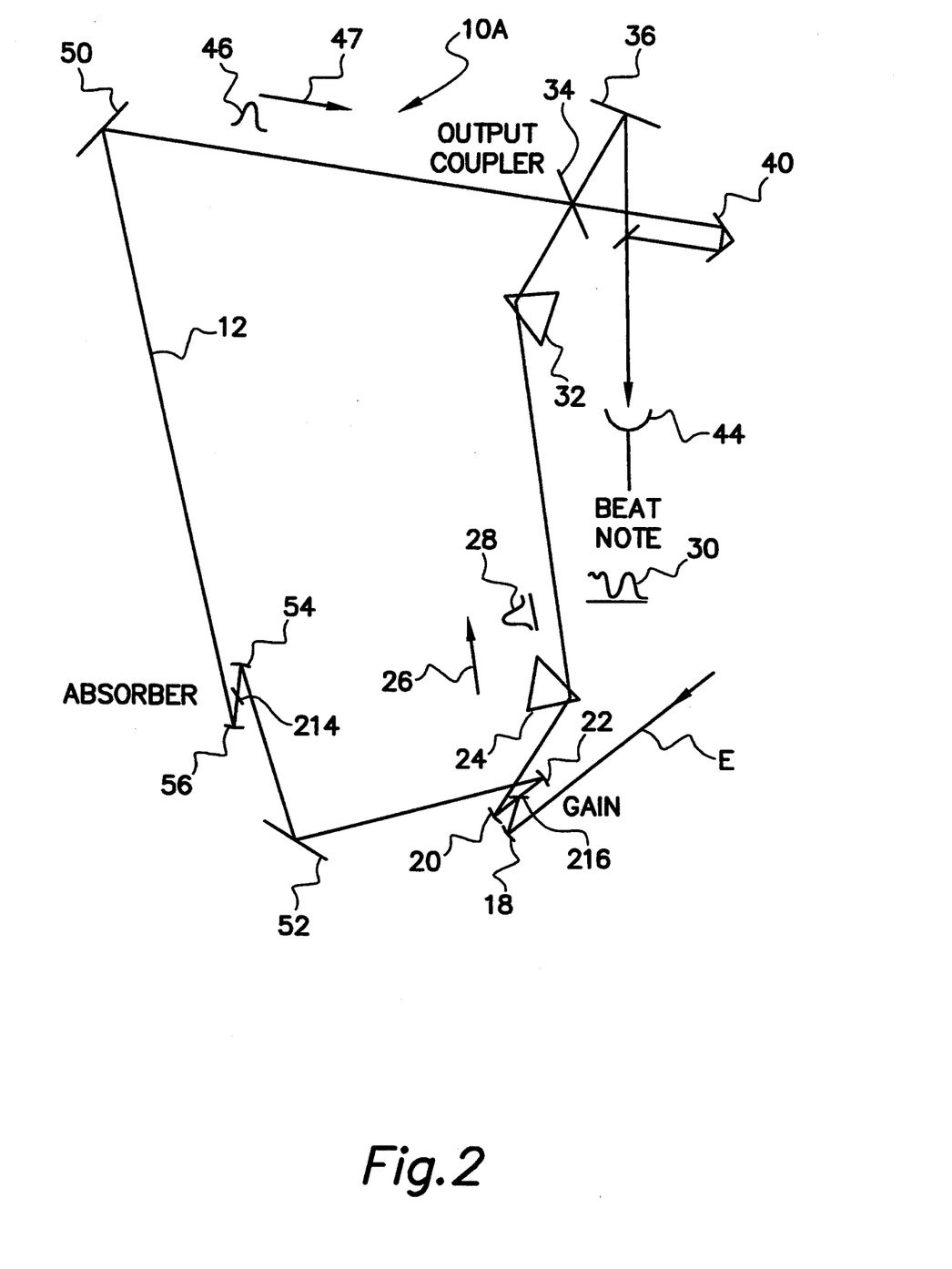
FIG. 2 shows a mode-locked dye laser.

The present invention exploits principles discovered by the inventors in investigating the gyroscopic response of a femtosecond ring dye laser operating on a rotating platform as shown, for example in FIG. 2. The investigation was carried out at the University of New Mexico Physics and Astronomy Department.

Expected advantages of a mode-locked laser gyro over a conventional CW laser gyro include smaller coupling between the two counterpropagating waves and the absence of mode competition in a homogeneously broadened gain medium. Both features are a result of the fact that the two counterpropagating pulses in a passively mode-locked laser cavity only meet at two points, both outside of the gain medium. However, in a passively mode-locked laser, it is a strong coupling between two counterpropagating waves that establishes the crossing point between the two pulses. It is therefore logical to expect that this same coupling may result in a lock-in of the gyro response. In investigating the dye laser it was demonstrated that, despite this coupling, the femtosecond dye laser has a gyroscopic response without measurable dead band. The present invention builds on this result to provide a solid state gyro with substantially no dead band.

SUMMARY OF THE INVENTION

A passively mode-locked laser gyro having a saturable absorber in constant motion is provided. The saturable absorber is mechanically vibrated or rotated in a direction generally transverse to the longitudinal pulses passing through the absorber. The vibrational or rotational motion of the absorber averages out the phase of the scattering causing frequency lock-in of the gyro, or a dead band. The saturable absorber may be a multiple quantum well device. The multiple quantum well device may be attached to two dither drives to provide continuous circular motion of the multiple quantum well device. The motion generator can generate both linear and non-linear motion. The passively mode-locked laser gyro may be constructed from fiber optics with a solid state gain medium to provide laser energy.

DESCRIPTION OF THE PREFERRED EMBODIMENT

Referring to FIG. 2, a sketch of a laser cavity and detection interferometer for a dye laser is shown. The laser apparatus 10A comprises a laser gyro path 12, a saturable absorber 214, a dye gain medium 216, first and second prisms 24, 32, first and second corner mirrors 50, 52, output coupler 34, output mirror 36, optical delay element 40, and detector 44.

The gyroscopic response or scale factor R of a ring laser is the ratio of the beat note $\Delta v$ (in Hz) between the counterpropagating modes in the laser, to the rotation rate $\Omega$ (in radian/s) of the laser support. In the case of a femtosecond (fs) laser, accurate delay lines have to be used to make the pulse trains corresponding to the two opposite senses of rotation interfere on the detector. A beat note between the two fs-pulse trains is readily understood in the frequency domain. Each pulse train corresponds to a comb of equally spaced spectral lines which are called laser modes. The spectral combs of the two pulse trains are identical but shifted with respect to each other by a small amount due, for example, to a cavity rotation. The beat note is a measure of the relative shift between the two spectral combs. If A is the ring laser area, P its perimeter and $\lambda$ the wavelength, the gyroscopic response is given by:

$$\Delta v = \frac{4A}{P\lambda} \Omega = \Omega \qquad (1)$$

Since a large ratio of area to perimeter is desirable, a large square cavity femtosecond laser was designed for the dye laser investigation. Such a shape implies large angles of incidence on curved optics, hence strong astigmatism. Choosing the absorber jet as origin, the complete round-trip ABCD matrix of the ring was calculated using the algebraic manipulation language MACSYMA. The expressions for the matrix elements are used in a FORTRAN optimization program, which scans all possible values of the folding angles and inter-mirror distances to determine the stability ranges (distances between pairs of curved mirrors) and the optimum condition for which a round focal spot is obtained in the absorber. The resulting cavity 10A, shown in FIG. 2, has an area of 1.42 m² and a perimeter of 5.09 m. The scale factor R is 0.79915 MHz/(radian/s) or 31.40 kHz/(°/s).

Figure 3:
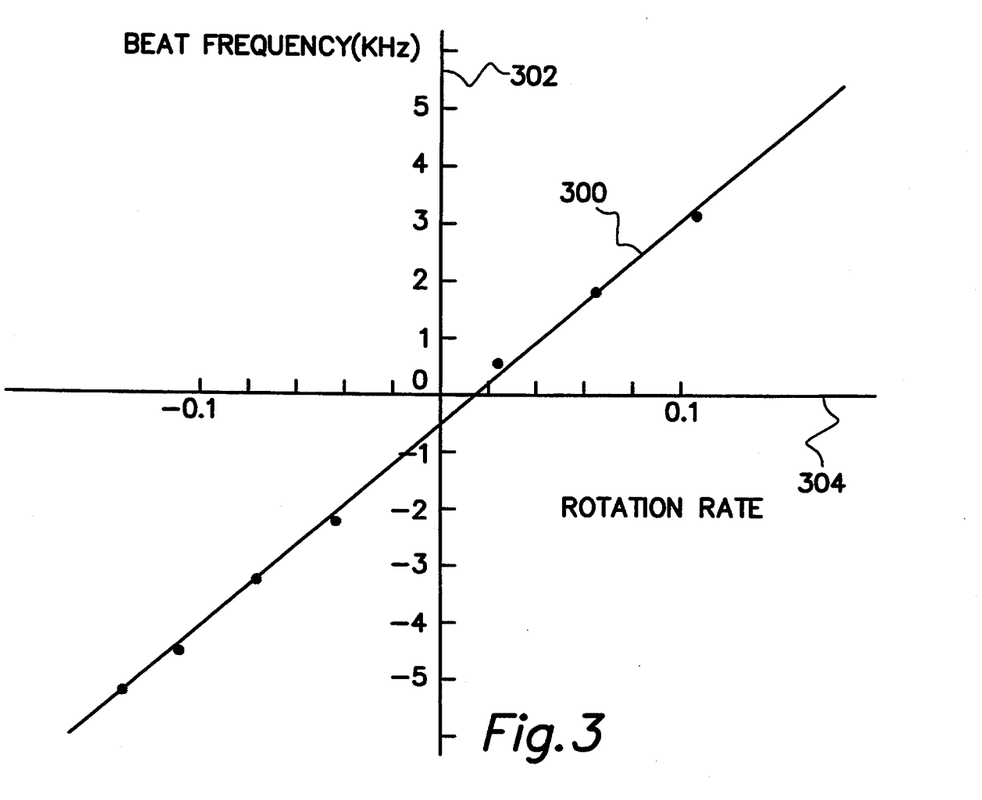
FIG. 3 shows a plot of beat frequency versus rotation rate of a laser gyro.

The gyro response of this mode-locked dye laser operating at 620 nm with Rh6G as gain medium and DODCI as saturable absorber is shown in FIG. 3. FIG. 3 shows a plot 300 of the beat frequency on abscissa 302 versus the rotation rate on ordinate 304. The pulse duration is about 100 fs. The beat frequency is obtained by overlapping the two pulse trains temporally and spatially on a slow photodiode via an extracavity delay line 40, as shown in FIG. 2. The data confirm the absence of measurable dead band noted on measurement of Fresnel drag. By careful alignment of the cavity and by proper positioning of the absorber jet, the natural bias (i.e. the beat note frequency for the laser at rest in the experimental lab set up) of the laser can be eliminated up to the uncertainty due to the earth rotation rate (0.035°/s).

In the dye laser, the bias of the laser is attributed to the unbalance of the pulse energies at both the gain and absorber jets and the nonlinearities of the jets. There are numerous nonreciprocal nonlinear mechanisms in the laser cavity that can account for a bias. The observations point to saturation induced changes in index in the absorber and gain jets. While the intensities are nearly balanced at the absorber jet (as expected because of the mutual coupling through the transient grating in the absorber), there can be as much as 20% imbalance between the two intensities at the gain jet. The strong saturation lensing at the absorber jet explains the strong dependence of the bias note on the jet position. Indeed, a translation of the absorber jet within the Raleigh range of its focusing optics modifies the parameters of the cavity, in particular the beam sizes in the gain jet—hence the saturation conditions. While the bias was changed from negative to positive by adjusting the cavity alignment and the absorber jet position, the laser average outputs did not change by more than 2%.

The slope of the data corresponds substantially exactly to the predicted scale factor. No departure from linearity can be observed within the accuracy of the measurement. The error bars in the abscissa are due to inaccuracies of the drive mechanism at the lowest speeds. The main causes of error in the data are vibrations of the components of the measuring interferometer, and, to a lesser extent, small vibration of the laser base or components. It can be readily seen that mechanical vibrations of amplitude $d_{mech}$ and frequency $v_{mech}$ result in a broadening of the beat frequency by an amount $\Delta v_{vib} = v_{mech} d_{mech}/\lambda$, independently of the size or geometry of the cavity. If it is assumed that both the scale factor and the stiffness of the cavity are inversely proportional to the size of the cavity, the performances of this size of gyro are not very sensitive to its size. The 100 Hz linewidth of the beat frequency is thus due to vibrations of the components of this unstabilized laser.

The waveform of the beat note is approximately sinusoidal down to the lowest frequencies observable. Even at the lowest frequencies, modulation in the amplitude of any of the beams is not observed. These two observations concur to indicate a very low threshold for lock-in.

In order to be able to observe the lock-in characteristics of this laser, a scattering element, namely an antireflection coated glass window was introduced at the pulse crossing point opposite to the absorber jet. The amount of coupling was adjusted by translating the glass scatterer through the crossing point, resulting in a conventional dead band in the gyro response. At beat frequencies close to the lock-in threshold, the waveform is distorted, and there is strong amplitude modulation of each of the counter-rotating pulse trains. The width of the dead band is, as expected, of the order of the pulse length (i.e. 50 µm). By feeding an output pulse back to the laser cavity with an adjustable delay, it was confirmed that, for different pulse durations, the width of the dead band is indeed equal to the pulse length.

It is expected for a laser gyro that, at low rotation rates, the gyroscopic response vanishes because of scattering of one beam into the other. If r is the scattering coefficient for the field of one of the laser beams into the counterpropagating laser field, a general upper limit for the lock-in rotation rate $\Omega_c$, is given by:

$$\Omega_c = \frac{rc\lambda}{2A} \quad (2)$$

To establish a lower limit for the scattering coefficient r introduced by the saturable absorber jet, a simple measurement on a jet of pure ethylene glycol was performed. In this procedure, the beam of an argon ion laser is focused onto the jet by a 2.5 cm focal distance lens. The geometry and aperture sizes are carefully adjusted to eliminate backscattering from all surfaces such as the lens and jet. The minimum backscattering radiation from the jet is 1.5 10$^6$ of the incident intensity. This value corresponds to a field backscattering coefficient of r=1.2 10$^{-3}$. According to Equation (2), such a value for the backscattering coefficient corresponds to a lock-in rotation rate of 5°/s for a ring of 1.4 m$^2$ area, at a wavelength of 620 nm. The actual lock-in rate should be much larger, in view of the additional contribution from the absorber dye.

In order to interpret the very low lock-in threshold in presence of large scattering from the absorber jet, the effect of transverse motion of scatters was investigated. One of the laser outputs was focused on a reflecting tape commonly used for a bicycle. The location of the tape was such that the backscattered pulse reentered the laser cavity and overlapped with the pulse in the opposite direction. The tape was attached to a speaker so that the scattering particles of the tape could move transversely to the laser beam. When the tape was at rest, strong lock-in was observed. As shown in FIGS. 4A-4F, as the driving voltage to the speaker was increased, the beat signal resumed its sinusoidal shape as if no scattering was present. The driving voltage was selected to have a frequency of about 50 Hz. The maximum amplitude of the 50 Hz vibration was 120 µm.

Figure 4A:
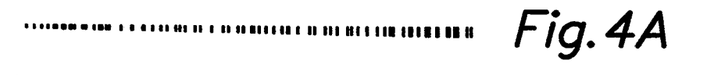
FIG. 4A–4F show traces which indicate elimination of dead band by motion of scatters.
Figure 4B:
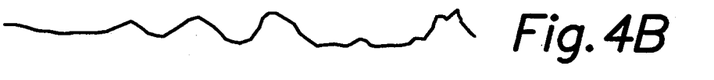
Figure 4C:
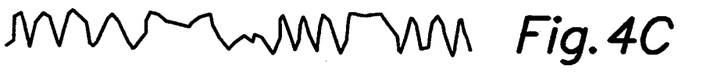
Figure 4D:
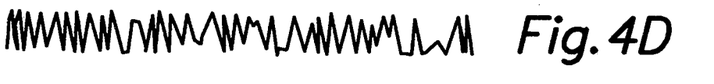
Figure 4E:
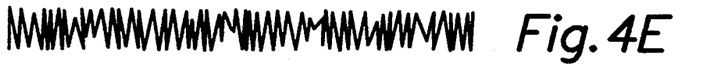
Figure 4F:
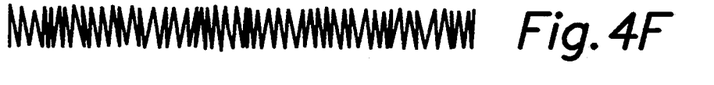
Figure 5:
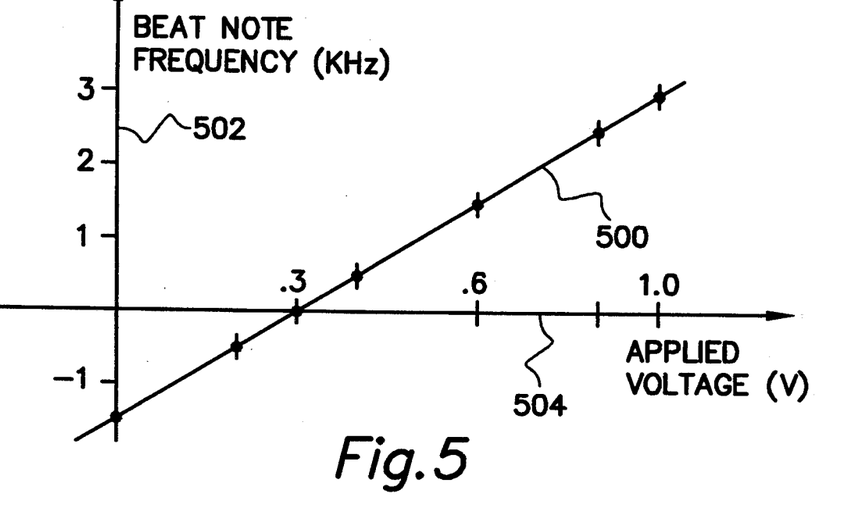
FIG. 5 is a graph of laser gyro beat note versus peak voltage of detected pulse.

FIG. 4A is a trace showing no scatters. FIG. 4B shows scatters at rest. FIGS. 4C-4F are increasing magnitudes of motion. In trace 4F, the beat note resumed its shape as if there were no scatters.

The observation of FIGS. 4A-4F can be readily understood by examining the equation of motion of the relative phase Ψ between a pair of the beating modes $$\psi = \frac{\Omega}{2\pi} + \alpha\sin(\Omega + \epsilon) \quad (3)$$

where $\Omega$, $\alpha$, and $\epsilon$ are respectively the mode splitting (beat note frequency) due to cavity rotation or bias, the coupling coefficient of the modes, and the phase shift of the backscattering. When the phase shift $\epsilon$ changes much faster than $\Omega$, the second term in Equation (3) vanishes on average, and the two laser modes experience no coupling. Physically, the requirement for eliminating the dead band appears to be the scattering particles moving through the beam in a time much shorter than the period of the beat note to be observed. This is what happens in the dye laser. The transient time of the scatters in the absorber jet is about 1 µs, much shorter than the typical beat note period of 1 ms.

A great advantage of a mode-locked laser gyro is the feasibility of introducing intracavity elements without disturbing its gyroscopic response, provided that the inserted elements are not located at the pulse crossing points. With the understanding of the effect of motion of the scatters and with the demonstration of the electro-optical dither, a passively mode-locked, all solid state ring laser gyro may be fabricated. The absorber section of the laser should be kept moving transversely to the laser beams in, for instance, a circular fashion.

The investigated laser system is basically a very sensitive instrument for anisotropic measurement. Because of the feasibility of adding intracavity optics, the laser is suitable for many intracavity experiments which are not possible with CW ring lasers. In particular, when a sample is located away from the pulse crossing points, any index change induced by, for instance, an electrical or optical pulse train synchronized with one of the cavity pulse can be measured via the beat frequency. In addition, because the cavity pulse is of 100 fs, the above measurement can have a high time resolution. Also, intracavity pump-probe experiments can be straightforward. In these experiments, one of the cavity pulse is used as a pump pulse, and the other, as a probe pulse; the relative delay can be obtained simply by moving the sample away or toward a pulse crossing point.

Figure 1:
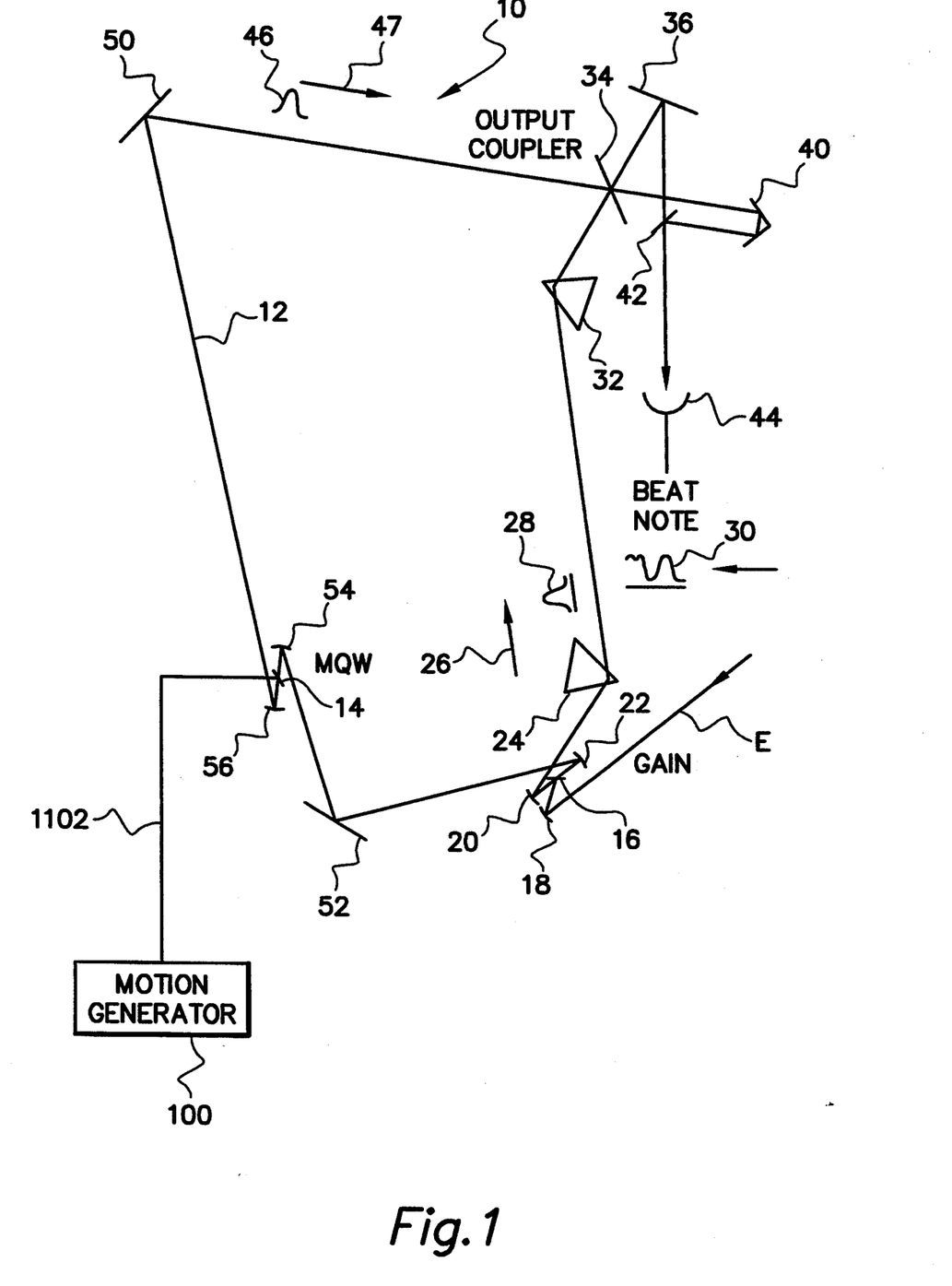
FIG. 1 shows schematically a laser gyro including a mechanism for inducing motion on an absorber as employed in one embodiment of the invention.

Referring to FIG. 1, one embodiment of an apparatus including a motion generator for elimination of dead band in a short pulse laser gyro as contemplated by one aspect of the invention is shown. The apparatus comprises a laser gyro 10 including a laser gyro path 12, a solid state absorber 14, a solid state gain medium 16, first and second prisms 24, 32, first and second corner mirrors 50, 52, output coupler 34, output mirror 36, optical delay element 40, and detector 44. A motion generator 100 is coupled by coupling means 1102 to the solid state absorber 14. The solid state absorber 14 may advantageously comprise a multiple quantum well (MQW) semiconductor device as disclosed, for example, by Raja et al. in an article entitled "Novel Wavelength-Resonant Optoelectronic Structure and Its Application To Surface-Emitting Semiconductor Lasers", Electron. Lett., 24:1140–1142, 1988. The multiple quantum well semiconductor device is a saturable absorber. The gain medium 16 may advantageously comprise any well known gain medium. The prisms 24, 32 are optional and are employed in a well known manner for conditioning the beams.

In operation, an external energy source (not shown) provides electrical or other type of appropriate energy E to stimulate the gain medium 16. The stimulation energy E, in this example, is reflected into the gain medium 16 via focusing mirror 18 and the gain medium 16 lases along path 12. Of course mirror 18 would not be needed in the case where electrical energy is employed to stimulate the gain medium. In that case an electrical connection would be used. Mirrors 20 and 22 may be employed advantageously to direct the laser emission from gain medium 16. The absorber 14 is located between mirrors 54 and 56 which focus the laser emission onto the absorber 14. The absorber 14 creates first and second counterpropagating pulses 28 and 46 respectively. The first pulse 28 propagates in a counter clockwise direction around the path 12 as indicated by arrow 26. The second pulse propagates in a clockwise direction as indicated by arrow 47. In one example of the invention, pulses 46 and 28 comprise pulses each having a short pulse duration of about 100 femtoseconds. The pulses propagate around the laser path at a rate of one pulse every ten nanoseconds. The semiconductor absorber 14 is located such that the counterpropagating pulses periodically meet at the middle of the absorber medium 14. The motion generator 100 introduces a substantially circular motion onto the semiconductor absorber 14. Movement of the semiconductor absorber 14 may advantageously be done transversely to the motion of scatters. The induced vibration, therefore, effectively dithers the absorber, thereby substantially reducing or eliminating the dead band in the laser gyro. Thus, the lock-in phenomenon, wherein the two laser modes couple together, is substantially eliminated.

Figure 6:
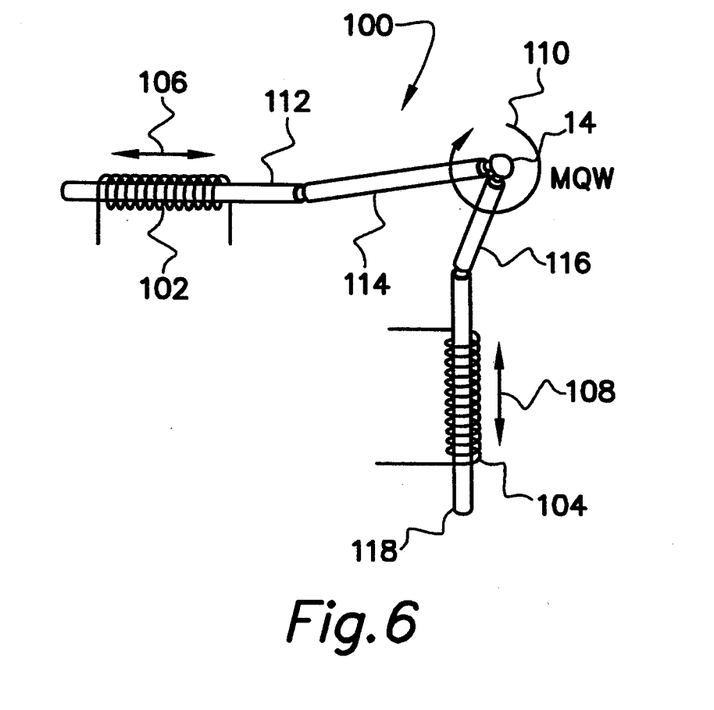
FIG. 6 schematically shows one example of a motion generator as contemplated by one example of the invention.

Now referring to FIG. 6, one example embodiment of a motion generator 100 as contemplated by the present invention is shown. The motion generator 100 comprises first and second solenoid coils 102,104, first and second solenoid shafts 112,118, and first and second spring blades 114, 116. The first and second spring blades 114, 116 are coupled to the semiconductor absorber 14. The mechanism shown is to be understood to be by way of example and not by way of limitation. There are various other mechanical, piezoelectrical, electromechanical, hydraulic and other equivalent devices which may be employed to induce the motion of the absorber according to the principles of the invention. In this example, the first and second coils 102,104 may be, for example, voice coils as may be commonly employed in, for example, computer disk drives. Control of such voice coils by various types of electrical control signals is well known. The coils 102,104 together with the first and second shafts 112,118 operate as solenoids to move the shafts 112, 118 in transverse motions with respect to each other as indicated generally by directional arrows 106, 108. The shafts are coupled to the spring blades which are selected to be flexible enough so as to induce a circular motion of the semiconductor absorber 14, generally indicated by circular arrow 110. When the coils are activated they cause transverse motion of the shafts which results in a generally circular motion of the absorber 14.

The semiconductor absorber 14 may be advantageously cylindrically moved in such a way at a rate of about 50 Hz or more. Other frequencies may be employed depending upon the type of gyro, the size of the ring laser path and other variables. The mechanism in one embodiment of the invention may move the semiconductor absorber in a circular path having a diameter of about 1 mm.

It will be understood by those skilled in the art that the laser path 12 represents any of a plurality of types of laser waveguides. The laser path 12 may advantageously comprise an optical path, a fiber waveguide, a solid state waveguide or other functionally equivalent laser waveguide.

Figure 7:
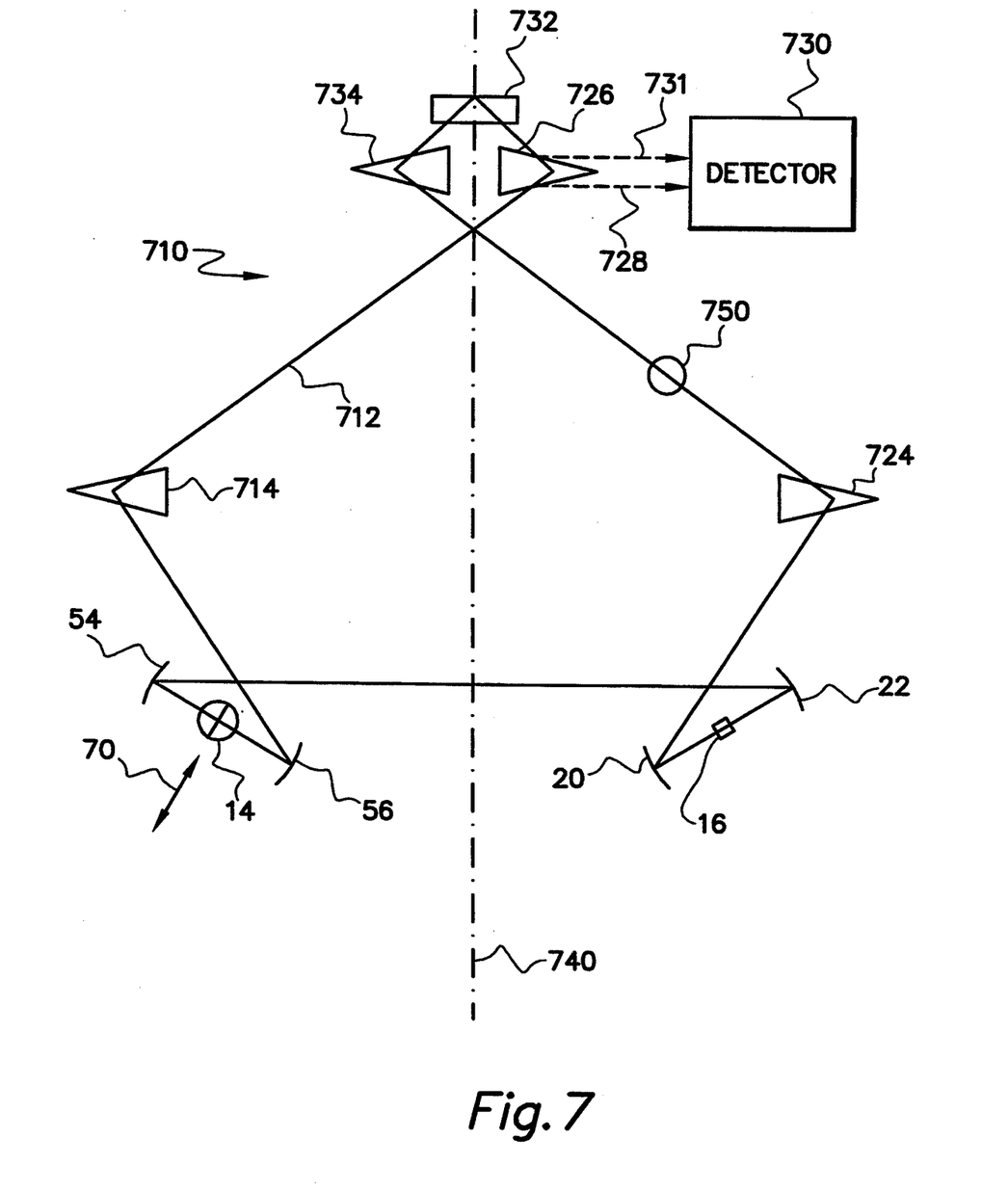
FIG. 7 shows schematically an alternate embodiment of the laser gyro of the invention.

Now referring to FIG. 7, an alternate embodiment of a laser gyro employing the principles of the invention is shown. Laser gyro 710 includes a laser path 712, dispersive prisms 714,724,734 and 726. Also included are a gain element 16 and a semiconductor absorber 14 which are operated in a manner similarly to that described hereinabove with reference to FIG. 1. That is, the semiconductor absorber is located at a crossing point where the counterpropagating pulses periodically meet. A second crossing point exists at location 750 which is equidistant from absorber 14. The laser is generally centered on an axis 740 passing through the center of a mirror 732. Dashed arrow 728, 731 indicate counterpropagating pulsed outputs to a detector 730. The detector 730 may be any well known detector mechanism and may be similar to the detection device described hereinabove with reference to FIGS. 1 and 2. Double-ended arrow 70 indicates the movement of semiconductor absorber element 14 by a motion generator such as the one shown in FIG. 1. The dispersive prisms may comprise, for example, ZnSe material. The gain element 16 may comprise, for example, Gallium Arsenide (GaAs).

Figure 8:
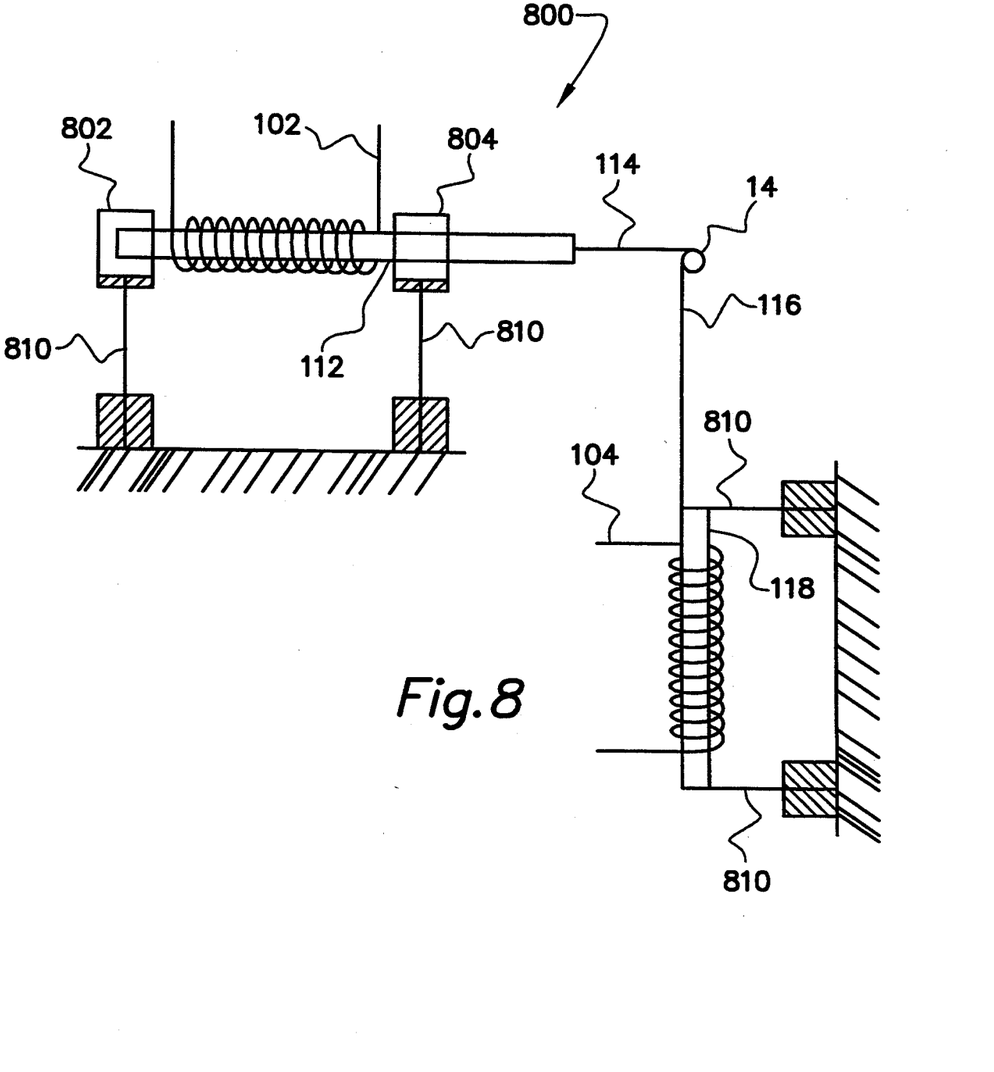
FIG. 8 shows schematically an alternate embodiment of a motion generator as contemplated by the invention.

Now referring to FIG. 8, an alternate embodiment of a motion generator as contemplated by the invention is shown schematically. A motion generator 800 includes coils 102 and 104, electromagnetic element shafts 112, 118 and first and second spring blades 114, 116. Electromagnetic shaft 112 is secured in housings 802 and 804 which are further connected to third and fourth spring blades 810. The third and fourth spring blades 810 are secured to a mechanical ground. The second electromagnetic shaft element 118 is attached at a first end to a fifth spring blade 810 and at a second end to a sixth spring blade 810. The fifth and sixth spring blades are also connected to a mechanical ground. Introduction of an appropriate signal on the coils 102, 104 magnetically induces the shafts 112, 118 to move in directions transverse to their respective longitudinal axes. Spring blade 114 is attached to shaft 112 at a first end and to the absorber element 14 at a second end. Similarly, spring blade 116 is attached at a first end to the absorber element 14 and at a second end to the shaft 118. The transverse movement of the shafts in an oscillatory fashion will cause the absorber element 14 to rotate in a substantially circular motion.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A passively mode-locked laser gyro having a laser path, comprising:
   (a) an optical gain medium located in the laser path;
   (b) a multiple quantum well (MQW) device located in the laser path optically connected to the optical gain medium; and
   (c) means for moving the MQW device continuously relative to the optical gain medium.

2. The passively mode-locked laser gyro of claim 1 wherein the MQW device is moved in a continuous non-linear fashion.

3. A passively mode-locked laser gyro comprising:
   (a) an optical gain means for emitting laser energy;
   (b) a saturable absorber optically connected to the optical gain means; and
   (c) modulation means coupled to the saturable absorber wherein the optical gain means and saturable absorber create a closed looped optical path, the modulation means for moving the saturable absorber continuously relative to the optical gain means.

4. The passively mode-locked laser gyro of claim 3 wherein the modulation means moves the saturable absorber in a continuous nonlinear fashion.

5. The passively mode-locked laser gyro of claim 3 wherein the modulation means moves the saturable absorber substantially in a circle with linear motion.

6. The passively mode-locked laser gyro of claim 3 wherein the modulation means comprises:
   (a) first linear dithering means attached to the saturable absorber for creating motion substantially along one axis; and
   (b) second linear dithering means for generating motion along a second axis which intersects the first axis such that the saturable absorber has a velocity relative to the optical gain means which is never zero.

7. The passively mode-locked laser gyro of claim 6 wherein the first and second dithering means cooperate to move the saturable absorber substantially in a circular motion.

8. The passively mode-locked laser gyro of claim 6 wherein the saturable absorber is a multiple quantum well device.

9. The passively mode-locked laser gyro of claim 6 wherein the laser comprises a short pulse laser.

10. The passively mode-locked laser gyro of claim 6 wherein the first and second dithering means create an oscillatory motion having a frequency of at least 50 Hz.

11. The passively mode-locked laser gyro of claim 6 wherein the optical path includes a fiber optic waveguide.

12. A short pulse laser gyro apparatus having first and second counterpropagating pulses comprising:
   (a) means for forming a laser path including a means for providing an output from the laser path;
   (b) means for detecting disposed to receive the output;
   (c) means for providing gain located within the laser path;
   (d) a semiconductor absorber located in the laser path at a point where the first and second counterpropagating pulses simultaneously periodically cross; and
   (e) means for continuously moving the semiconductor absorber so as to substantially reduce gyro lock-in.

13. The apparatus of claim 12 wherein the laser path is formed by a fiber waveguide.

14. The apparatus of claim 13 wherein the laser path is formed by a solid state waveguide.

15. The apparatus of claim 12 wherein the gain means comprises a multiple quantum well.

16. The apparatus of claim 12 wherein the semiconductor absorber comprises a multiple quantum well.

* * * * *